United States Patent
Kuo et al.

(10) Patent No.: US 6,618,439 B1
(45) Date of Patent: Sep. 9, 2003

(54) FAST MOTION-COMPENSATED VIDEO FRAME INTERPOLATOR

(75) Inventors: Tien-Ying Kuo, Taipei (TW); Chung-Chieh Kuo, Taipei (TW); Chia-Wen Lin, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 09/348,630

(22) Filed: Jul. 6, 1999

(51) Int. Cl.$^7$ .............................................. H04B 1/66
(52) U.S. Cl. ........................ 375/240.16; 375/240.24; 382/236
(58) Field of Search ................... 375/240.16, 240.15, 375/240.29, 240.26, 240.27, 240.09, 240.12, 240.24; 348/402.1, 407.1, 414.1, 415.1, 416.1, 420.1, 417.1, 425.1, 700, 422.1; 382/236, 268, 242, 243; H04N 7/12; H04B 1/66

(56) References Cited

U.S. PATENT DOCUMENTS

| | | |
|---|---|---|
| 4,383,272 A | 5/1983 | Netravali et al. |
| 4,727,422 A | 2/1988 | Hinman |
| 4,771,331 A | 9/1988 | Bierling et al. |
| 4,958,226 A | 9/1990 | Haskell et al. |
| 5,303,045 A | 4/1994 | Richards et al. |
| 5,347,312 A | 9/1994 | Saunders et al. |
| 5,534,946 A | 7/1996 | Haan et al. |
| 5,777,682 A | 7/1998 | Haan et al. |
| RE35,910 E | 9/1998 | Nagata et al. |
| 5,844,616 A | 12/1998 | Collet et al. |
| 6,008,865 A * | 12/1999 | Fogel .......................... 348/700 |
| 6,192,079 B1 * | 2/2001 | Sharma et al. .......... 375/240.16 |
| 6,272,253 B1 * | 8/2001 | Bannon et al. ............. 382/236 |

OTHER PUBLICATIONS

A.M. Tekalp, "Digital Video Processing," Prentice Hall, Upper Saddle River, NJ, 1995, pp. 316–320.

C.Cafforio, F. Rocca, and S. Tubaro, "Motion Compensated Image Interpolation," IEEE Trans. Communication, vol. 38, No. 2, pp. 215–222, Feb. 1990.

S.Tubaro and F. Rocca, "Motion Estimators and Their Application to Image Interpolation," Motion Analysis and Image Sequence Processing, Kluwer Academic Publishers, 1993.

J.K. Su and R.M. Mersereau, "Motion–Compensated Interpolation of Untransmitted Frames in Compressed Video," +$^{th}$ Asilomar Conf. on Signals, System and Computers, pp. 100–104, Nov. 1996.

* cited by examiner

Primary Examiner—Gims S. Philippe
(74) Attorney, Agent, or Firm—Stevens, Davis, Miller & Mosher, LLP

(57) ABSTRACT

A block-based motion-compensated frame interpolation method and apparatus using a block-based video coder operating in low bit rates. Smooth movement of objects between video frames can be obtained without the complexity of pixel-wise interpolation motion estimation that is present in standard motion-compensated frame interpolation (MCI). An additional motion search for interpolating all of the individual pixel trajectories is not required because the interpolation uses block-based motion vector information from a standard codec such as H.26x/MPEG. Video quality is improved by increasing smoothness and the frame rate is increased without a substantial increase in the computational complexity. The proposed block-based MCI method maps from block-wise motion to pixel-wise motion in a motion vector mapping unit. A morphological closure operation and pattern block refinement segmentation of the blocks are provided to close holes in the moving object block and replace the morphologically closed motion block with the most similar pattern selected from a group of 34 patterns. Experimental results show that the visual quality of coded low-bit-rate video can be significantly improved as compared to the frame repetition scheme at the expense of a small increase in the complexity of the decoder.

16 Claims, 16 Drawing Sheets

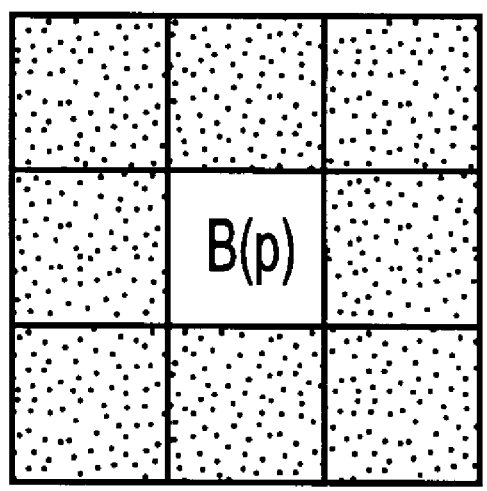
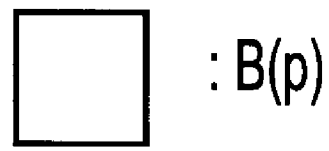
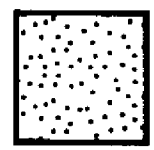
FIG. 2B

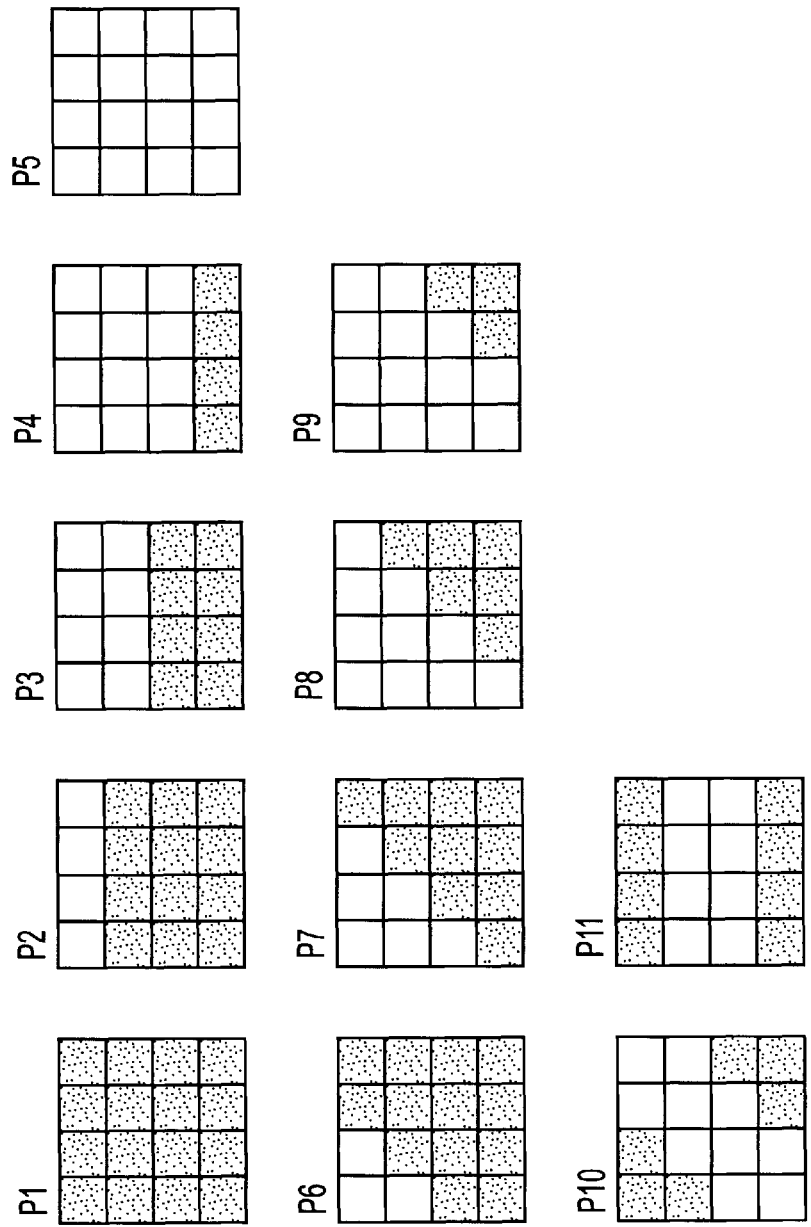

FAST MOTION-COMPENSATED VIDEO FRAME INTERPOLATOR

BACKGROUND OF THE INVENTION

1. Field of the Invention

The present invention relates to motion dependent video signal interpolation. More particularly, the invention relates to a method for deriving motion vectors for application in the interpolation of a video signal. The invention also relates to an interpolator apparatus for interpolating frames of an input video signal, and to a motion compensated standard video codec (encoder/decoder), such as H.26x or MPEG, for real-time applications with low-cost, high-quality frame interpolation.

2. Description of the Related Art

A video codec normally sacrifices visual quality to meet the budgetary bit constraints of very low bit rate applications (for example, video communications over Public Switched Telephone Networks (PSTN) and mobile networks) at 28.8/33.6 Kbps or lower bit rates. In practice, two rate control strategies are often jointly used to meet the low channel bandwidth requirements. The first strategy is to assign low data bits to encode each video frame. The second strategy is to reduce the video frame rate by dropping (not transmitting) part of the original video frames to maintain acceptable spatial picture quality of the coded frames. However, low bit allocation for video frames leads to noticeable spatial-domain artifacts (for example, blocking effect), and the low video frame rate can result in artifacts in the temporal domain (for example, motion jerkiness).

The motion jerkiness effect due to low temporal resolution of the coded picture can be improved with frame interpolation algorithms. For practical use of frame interpolation algorithms, the processing time and complexity are key factors to be considered.

As mentioned above, low video frame rate often causes motion jerkiness observed in the decoder. One simple and intuitive way to overcome this problem is by increasing the frame rate in the decoder to avoid jerky motion. To increase the frame rate, frame interpolation from available transmitted (or decoded) frames is required. A. M. Tekalp, "Digital Video Processing," Prentice Hall, 1995 discusses three possible techniques: (1) frame repetition, (2) frame averaging and (3) motion-compensated frame interpolation (MCI).

Frame repetition simply duplicates the preceding decoded frame as the interpolated frame. Although it is the simplest method to increase the frame rate, motion jerkiness is still observed because frame repetition does not provide transitional motion between the frames. FIG. 10 shows an example of frame repetition wherein an interpolated frame (fti), which is identical to preceding frame (ft1), is placed between frame (ft1) and succeeding frame (ft2).

Frame averaging interpolates frames using the averaged pixel intensity of preceding and succeeding decoded frames using a formula such as fti=(ft1+ft2)/2, as shown in FIG. 11. Frame averaging is smoother and increases the Peak Signal-to-Noise Ratio (PSNR) due to a better to performance on the stationary portion of the frame. However, significant ghost artifacts are observed along the boundary regions of moving objects because of the luminance change. It is obvious that in the low bit rate case, the motion field provides the most useful information.

Motion-compensated interpolation (MCI), a technique of using motion information to interpolate a frame between two transmitted decoded frames, usually provides the best results. MCI was originally developed in the context of frame rate conversion, such as the conversion between different video or TV systems (such as, NTSC⇌PAL and movie⇌television). As shown in FIG. 12, MCI calculates motion vectors representing the trajectories between each pixel in a preceding frame (ft1) and a current frame (ft2) to create an interpolated frame (fti) that is between frames (ft1) and (ft2). A great deal of complexity is involved in the calculation of motion vectors for each pixel. A great amount of work has been done in the field of MCI, and the following references are hereby incorporated by reference:

[1] A. M. Tekalp, "Digital Video Processing," Prentice Hall, Upper Saddle River, N.J. 1995).

[2] M. Bierling and R. Thomas, "Motion Compensating Field Interpolation Using a Hierarchically Structured Displacement Estimator," Signal Processing, pages 387–403, 1986.

[3] R. Thoma and M. Bierling, "Motion Compensating Interpolation Considering Covered and Uncovered Background," Signal Processing: Image Compression 1, pages 191–212, 1989.

[4] M. Bierling and R. Thoma, "Motion Compensating Field Interpolation Method Using a Hierarchically Structured Displacement Estimator," U.S. Pat. No. 4,771,331, September 1988.

[5] C. Cafforio, F. Rocca, and S. Tubaro, "Motion Compensated Image Interpolation," IEEE Trans. Communication, vol. 38, no. 2, pages 215–222, February 1990.

[6] S. Tubaro and F. Rocca, "Motion Estimators and Their Application to Image Interpolation," Motion Analysis and Image Sequence Processing, Kluwer Academic Publishers, 1993.

[7] J. K. Su and R. M. Mersereau, "Motion-Compensated Interpolation of Untransmitted Frames in Compressed Video," 30th Asilomrar Conf. on Signals, System and Computers, pages 100–104, November 1996.

[8] B. L. Hinman, "Method and Apparatus for Efficiently Communicating Image Sequence Having Improved Motion Compensation," U.S. Pat. No. 4,727,422, February 1988.

[9] A. Nagata, K. Takahashi and N. Takeguchi, "Moving Image Signal Encoding Apparatus and Decoding Apparatus," U.S. Pat. No. RE35910, September 1998.

[10] E. Collet and M. Kerdranvat, "Method and Apparatus for Motion Interpolated Interpolation," U.S. Pat. No. 5,844,616, December 1998.

[11] A. N. Netravali and J. D. Robbins, "Video Signal Interpolation Using Motion Estimation," U.S. Pat. No. 4,383,272, April 1981.

[12] N. I. Saunders and S. M. Keating, "Motion Compensated Video Signal Processing," U.S. Pat. No. 5,347,312, September 1994.

[13] J. W. Richards and C. H. Gillard, "Standards Conversion of Digital Video Signals," U.S. Pat. No. 5,303,045, April 1994.

[14] B. G. Haskell and A. Puri, "Conditional Motion Compensated Interpolation of Digital Motion Video," U.S. Pat. No. 4,958,226, September 1990.

[15] G. De Haan et al., "Apparatus for Performing Motion-Compensated Picture Signal Interpolation," U.S. Pat. No. 5,534,946, July 1996.

[16] G. De Haan et al., "Motion-Compensated Interpolation," U.S. Pat. No. 5,777,682, July 1998.

Thoma et al. (reference [3]) disclose an MCI method which considers both covered and uncovered backgrounds. They employed hierarchical displacement motion estimation to provide a better displacement field for interpolation. For the frame rate conversion problem as discussed above or in most previous MCI work (references [2–6,11,13,15]), instead of using a block-based motion field, pixel-wise motion estimation is often required to determine the dense motion field in order to provide an accurate motion trajectory for each pixel. As a consequence, the computational complexity of MCI is very high due to the complicated motion estimation process involved and thus is not practical for real-time video communication applications (e.g., videophone and videoconferencing).

In applications such as videophones and videoconferencing, frame interpolation is performed at the decoder of a block-based compression standard such as MPEG and H.26x. Therefore, the motion information is already available to the decoder. However, the motion information from standard video decoders is in the form of a block-based motion field rather than a pixel-based motion field. In order for MCI to use the output of a standard block-based video decoder, an additional motion search during interpolation would be required. The additional motion searches during interpolation would increase the complexity and costs of the system to make it impractical for many applications.

Su et al. (reference [7]) disclose a system utilizing a block-based motion field from a video decoder for frame interpolation. One of their proposed techniques does not require an additional motion search during interpolation. However, their approach is a simple MCI design that does not consider the location of the moving object. Consequently, the covered and uncovered backgrounds cannot be predicted correctly. This approach does not provide satisfactory video quality for many applications.

A similar method to that of Su et al. is found in U.S Pat. No. 4,727,422 (reference [8]). Both the Su et al. method and the method of U.S. Pat. No. 4,727,422 cause errors in the interpolated frames because there are no correct motion vectors in cases where: (1) there are objects which move in different directions from each other in a block; (2) the background appears from the shade of a moving object (uncovered background), or the background is hidden by a moving object (covered background); (3) the moving object changes in shape; and (4) there is a movement accompanied by rotation.

In U.S. Pat. No. RE35910 (reference [9]), a specially designed error evaluator and coder associated with a frame interpolator is included in the block-based motion-compensated video encoder to evaluate and encode the interpolation error so that an error corrector at the video decoder can use the error information to compensate the interpolation errors mentioned above. This proposed method is not compatible with the existing H.26x/MPEG video coding standards, since there are no such mechanisms to provide interpolation error information in the standard H.26x/MPEG bitstreams. In this proposed method, the complexity of the video encoder will increase while the coding efficiency will decrease since the method requires additional extra circuitry and bits to evaluate and transmit the interpolation errors. A similar idea is found in U.S. Pat. No. 4,958,226 (reference [14]).

A method disclosed in U.S. Pat. No. 5,844,616 (reference [10]) reduces the hardware complexity of the MCI with sub-pixel accuracy for HDMAC/HDTV systems. The method focuses on the interpolation of pixels on the half-pixel grid using the available full-pixel samples, while the potential problems associated with the attempted use of a block-based MCI format are not addressed.

In U.S. Pat. No. 5,534,946 (reference [15]), an ordered statistical filtering method using more than one motion vector is disclosed in order to refine the motion field so as to eliminate the artifacts arising due to the discontinuities of the motion vector field in MCI. In U.S. Pat. No. 5,777,683 (reference [15]), a similar approach is proposed for block-based MCI.

A brief overview of MCI will be provided. Symbols and terminology used throughout this application are defined:

p-denotes the 2-D pixel Cartesian coordinate in a frame;

ft refers to the frame at temporal reference t;

ft(p) represents the intensity at pixel p of frame ft;

B(p) designates the macroblock (typically consisting of 16×16 pixels) to which pixel p belongs;

N(p) represents the eight nearest neighbor macroblocks around B(p);

NB(p) is equal to B(p)∪N(p);

Vm,n(B(p)) is a block-based motion vector of block B(p) from ftm to ftn;

vm,n(p) denotes the displacement motion vector for pixel p from ftm to ftn, where the displacement motion vector is defined as the inter-image motion of the contects of a respective macroblock.

A macroblock consists of 16×16 pixels.

INTRA coding refers to encoding a picture (a field or a frame) or a macroblock without reference to any other picture or macroblock, but the INTRA-coded picture or macroblock of picture pixels can be used as a reference for other pictures and macroblocks.

INTER coding refers to encoding a picture (a field or a frame) or a macroblock with reference to another picture or macroblock of picture pixels. Compared to the INTRA-coded picture or macroblock, the INTER-coded picture or macroblock may be coded with greater efficiency.

Given two continuous decoded frames, i.e. the preceding frame ft1 and the current frame ft2, where t1<t2, the goal of frame interpolation is to insert an interpolated frame fti at time ti, wherein: t1<ti<t2. The concept of MCI is to interpolate the frame fti based on the knowledge of the location of moving objects and the corresponding motion trajectories among ft1, ft2 and fti.

Standard MCI classifies each pixel inside a frame image into one of four classes: Moving Object (MO), Stationary Background (SB), Covered Background (CB) and Uncovered Background (UB) so that ft=MOt, SBt, CBt, or UBt (as shown in FIG. 13). These four classes are mutually exclusive. The interpolation ratios are as follows. Rf=(ti−t1)/(t2−t1) and Rb=(t2−ti)/(t2−t1) stand for the forward (from the preceding decoded frame to the interpolated frame) and the backward (from the current decoded frame to the interpolated frame) interpolation ratios, respectively.

Interpolation for various classes of objects is performed as follows.

It is assumed that MOt1, MOt2 and the motion vector field {v1,2(p)|p∈MOt2} are all known. Then, the motion trajectory Rb·v1,2(p) can be used with MOt2 to predict the object location. MOti on the interpolated frame fti. Once the moving object class MOti is determined, the Uncovered Background UBti, and the Covered Background CBti in the interpolated frame can be identified also. From FIG. 13, it is apparent that UBti is determined by finding out the Uncovered Background considering the object moving from MOt1 to MOt2. Since the corresponding position of UBti(p) is occupied by MOt1(p) at time t1, UBti(p) can be predicted only from the corresponding pixel background in ft2(p). CBti can be determined in a similar way. Finally, all of the remaining pixels can be classified as SBti. After the class for each pixel p is determined, the pixels of the interpolated frame can be predicted by using the following six equations:

MOti: $fti(p)=Rb \cdot ft1(p-Rf \cdot v1,2(p))+Rf \cdot ft2(p+Rb \; v1,2(p))$, if bi-directionally predicted (1)

$fti(p)=ft1(p-Rf \cdot v1,2(p))$, if forwardly predicted (2)

$fti(p)=ft2(p+Rb \cdot v1,2(p))$, if backwardly predicted (3)

UBti: $fti(p)=ft2(p)$ (4)

CBti: $fti(p)=ft1(p)$ (5)

SBti: $fti(p)=Rb \cdot ft1(p)+Rf \cdot ft2(p)$ (6)

As shown above, there are three possible methods to interpolate the MOti class.

However, there are problems associated with implementing MCI methods of the prior art. One problem associated with prior art MCI methods is the requirement of both a good segmentation design and true motion field information at the video decoder to obtain high-quality interpolation frames.

Another problem with MCI is the occurrence of overlapped pixels and holes in the interpolated object Moti. This problem is caused both by occlusion and resolution.

Occlusion may occur because of two circumstances. First, even if the true motion trajectory were available for each pixel in MOt2, the object is usually not under rigid motion. In other words, MOt1 and MOt2 are not of the same shape. Second, even when the object is under rigid motion, the estimated motion field may not be in parallel within the same object due to poor motion estimation. In either case, the motion trajectory is not a one-to-one mapping from MOt1 to MOt2. Therefore, the interpolated object MOti tends to contain some overlapped pixels and holes because of occlusion.

Resolution also causes overlapped pixels and holes. Considering that frames and motion fields are in an integer or half-pixel resolution, when the motion trajectory is traversed from integer pixel location p of MOt2, the mapping of that pixel in MOti is p+Rb(v1,2(p)), which may no longer match the image grid. Although rounding off to the desired resolution is commonly used, it leads to overlapping pixels and holes.

One solution to correct overlapped pixels involves averaging the intensities of the overlapped its pixels. However, there is still the problem of correcting the holes that is not solved by averaging intensities. Even though a spatial interpolation might be adopted as a way to correct the holes, this would become very complex because the spatial neighborhood of a hole may still contain other holes. Another way of correcting holes is by estimating the displacement motion of a particular hole by defining the neighboring displacement motion field and then traversing the motion trajectory from an integer pixel location in MOti to the possible fractional pixel location in MOt1 or MOt2. In this particular case, the resolution problem which occurs in the decoded frame can be easily handled by using spatial interpolation (since no hole is contained in the decoded frame), but a more complex system is required.

Accordingly, due to the above limitations, the prior art has been unable to provide a practical block-based MCI system, which does not require additional motion searches during interpolation, and yet provides acceptable video quality.

SUMMARY OF THE INVENTION

An object of the present invention is to provide a fast motion-compensated interpolation (FMCI) method for the decoder of a block-based video codec operating in low bit rates, or for use in frame rate up-conversion or for use in systems where the CPU computing power cannot meet the real-time requirement.

Another object of the present invention is to provide an apparatus for a motion compensated video frame interpolator which utilizes MCI without involving an additional motion search during interpolation, and which utilizes block-level motion vectors provided from a standard video decoder (such as H.26x/MPEG) rather than pixel-level motion vectors.

Still another object of the invention is to provide frame interpolation by a maximal exploitation of the available block motion information without employing an additional motion search in the decoder. Therefore, the complexity of the system can be reduced in comparison with standard MCI used in frame rate conversion. In an embodiment, the MCI prediction unit performs motion vector mapping to calculate UBti, CBti, and SBti (using equations (4) to (6)) and then performs standard MCI prediction.

According to a particular aspect.of the invention, there is provided a method of block-based motion-compensated interpolation of a video signal based on blockwise motion vectors and frame information of a plurality of frames being provided by a block-based video decoder. This method comprises (a) performing a segmentation operation on the plurality of frames of the video signal to identify an initial moving object block and background information blocks, wherein the background information blocks are identified as a stationary block (SB), an uncovered block (UB), and a covered block (CB); (b) mapping a motion vector of one of the blockwise motion vectors to provide an output of a mapped moving object block (MO) whose pixels each have the motion vector mapped thereto; (c) classifying the mapped moving object block (MO) obtained in step (b) and the background information blocks obtained in step (a) to identify an interpolated mapped moving object block (MOti) and interpolated background information blocks including an interpolated stationary block (SBti), an interpolated uncovered block (UBti), and an interpolated covered block (CBti); and (d) processing MOti, SBti, UBti, CBti and the frame information from the plurality of frames to generate an interpolated frame relative to the one of said frames. Step (d) may further include performing gap closure of the interpolated moving object block (MOti) to obtain increased solid areas to improve a quality of the interpolated frame. The segmentation operation may further comprise (i) performing a morphological closure operation by removing holes in the initial moving object block to obtain a morphologically closed segmented moving object block; and (ii) performing pattern block refinement by comparing the morphologically closed segmented moving object block obtained in step (i) with a plurality of pattern blocks, obtaining a pattern block having a closest matching pattern to the morphologically closed segmented moving object block, and replacing the morphologically closed segmented moving object with said pattern block selected in step (ii). The blockwise motion vectors and the frame information received in step (a) may be provided by one of an MPEG and a H.26x video decoder. Each pattern block of the plurality of pattern blocks may be a macroblock comprising 16×16 pixels provided in 16 sub-blocks arranged in a 4×4 matrix, and each one of the sub-blocks may comprise 16 pixels arranged in a 4×4 matrix. The plurality of pattern blocks may comprise 34 patterns. The method may further include providing the mapped moving object block (MO) produced by step (b) with a shape corresponding to a shape of the closest matching pattern block.

According to another particular aspect of the invention, there is provided an apparatus for performing block-based motion-compensated frame interpolation of a video signal based on blockwise motion vectors and frame information of a plurality of frames of the video signal. Such apparatus comprises (a) segmentation means for performing a segmentation operation on the plurality of frames of the video signal to identify an initial moving object block and background information blocks for one of the frames, the background information blocks comprising a stationary block (SB), an uncovered block (UB) and a covered block (CB); (b) mapping means for mapping a motion vector of one of the blockwise motion vectors to each pixel of the initial moving object block to provide a mapped moving object block whose pixels each have the motion vector mapped thereto; (c) classification means for processing the mapped moving object block (MO) output from the mapping means and the background information blocks obtained from the segmentation means to identify an interpolated mapped moving object block (MOti) and interpolated background information blocks including an interpolated stationary block (SBti), an interpolated uncovered block (UBti), and an interpolated covered block (CBti); and (d) motion compensated interpolation means for processing MOti, SBti, UBti, CBti and the frame information relating to the plurality of frames to generate an interpolated frame relative to the one of said frames.

The apparatus may further comprise a motion vector replacement unit for comparing the one of the blockwise motion vectors with a set of predetermined criteria to determine whether a value of the one of said blockwise motion vectors requires replacement with a corrected value; a residue map which maps prediction errors obtained from a block-based video decoder and outputs the mapped prediction errors to the motion vector replacement unit; a morphological closure unit for processing the initial motion moving object block output by said segmentation means to obtain a morphologically closed segmented moving object block; and a template matching unit for processing the morphologically closed segmented moving object block output by the morphological closure unit, wherein the template matching unit compares the morphologically closed segmented moving object block with a plurality of pattern blocks to obtain a most similar pattern block of said plurality of pattern blocks and outputs the most similar pattern block of the plurality of pattern blocks to the motion vector mapping unit in place of the morphologically closed segmented moving object block.

The motion compensated interpolation means may include a gap closure unit for processing gaps in the interpolated moving object block (MOti) to obtain increased solid areas in the interpolated moving object block (MOti) to improve a quality of the interpolated frame. The template matching unit may comprise 34 pattern blocks in storage. Each pattern block of the plurality of pattern blocks may comprise a macroblock of 16×16 pixels provided in 16 sub-blocks arranged in a 4×4 matrix; and each sub-block may comprise 16 pixels arranged in a 4×4 matrix.

The mapped moving object block (MO) output by the mapping means may have a shape corresponding to a shape of the similar pattern block output by the segmentation means.

The blockwise motion vectors and the frame information may be provided by a block-based video decoder comprising one of an MPEG video decoder and a H.26x video decoder.

BRIEF DESCRIPTION OF THE DRAWINGS

FIG. 2B shows details of the post-processing operation performed on the received motion vector field.

FIG. 4 illustrates predefined block patterns from which a morphological segmentation result is compared to achieve a final segmented result.

DETAILED DESCRIPTION OF THE PREFERRED EMBODIMENTS

In general, the motion information of the standard block-based motion field is very limited. However, after the motion post-processing and pattern block refined object segmentation of the present invention, it will be shown that a smooth interpolated image frame can be obtained.

Figure 1:
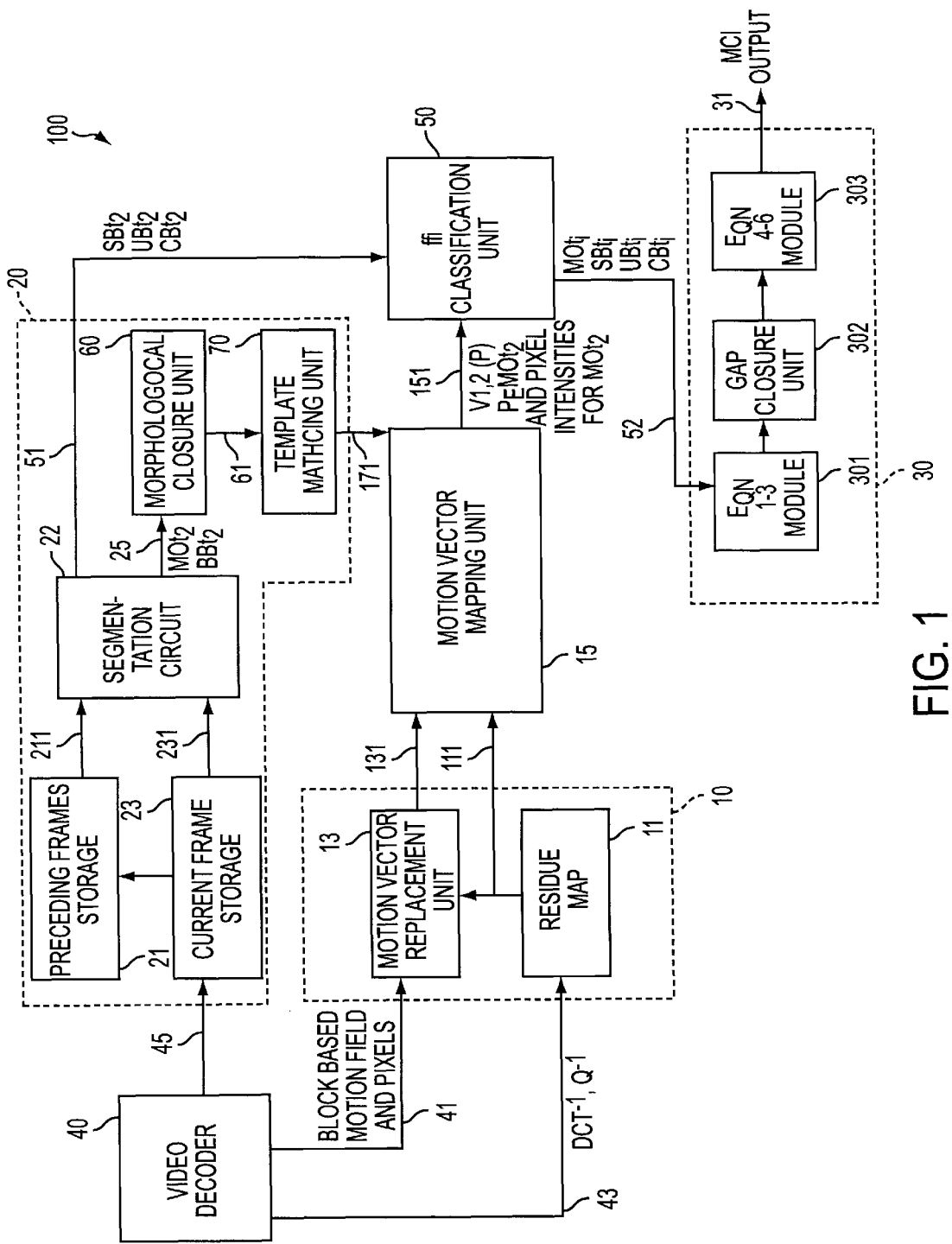
FIG. 1 is a block diagram showing the three main units of the FMCI device according to the present invention.

In an overview as shown in FIG. 1, FMCI device 100 of the present invention is implemented in a video decoder 40 as a video post-processing unit, which is cascaded with a standard H.263/MPEG decoder without changing the bitstream syntax. The FMCI device 100 comprises four units: a motion post-processing unit 10, a motion vector mapping unit 15, a segmentation unit 20, an ffi class identification unit 50, and an MCI prediction unit 30. The motion post-processing unit 10 receives from decoder 40 on line 41 blockwise motion vectors block MV and pixel values relating to the current frame, and inverse discrete cosine transforms ($DCT^{-1}$) and dequantized prediction errors $Q^{-1}$ on line 43. The block-based decoder 40 also provides an output on line 45 to current frame storage unit 23 of segmentation unit 20 in the form of successively coded frames of a video image. Preceding frames storage unit 21 of segmentation unit 20 stores the two immediately preceding decoded frames ft3, ft2 relative to the current frame ft1, and current frame storage 23 stores the current incoming decoded frame ft1, where t1<t2<t3. The outputs of both the preceding frames storage unit 21 and current frame storage unit 23 are output to the segmentation circuit 22 at lines 211 and 231, respectively. Segmentation circuit 22 performs object segmentation to detect a moving object on all of the decoded frames for MCI prediction. FMCI does not use any complicated segmentation procedure. One reason for this is so that the computational load in the decoder is not increased. Another reason is that the segmentation is "rough" due to the use of only a block-based motion field, rather than a pixel-based motion field. By using frame differences between preceding frames and a current frame, the segmentation circuit 22 provides, at line 51, information about stationary, uncovered and covered blocks SBt2, UBt2, and CBt2, respectively, to ffi classification unit 50 and an output MOt2 on line 25 to morphological closure unit 60. The ffi classification unit 50 provides categorization information MOti, SBti, UBti and CBti on line 52 to MCI prediction unit 30.

Motion post-processing unit 10 includes a motion vector replacement unit 13 and a residue map 11 and provides an output on line 131 to motion vector mapping unit 15. It should be noted that the residue map 11 may not be necessary in low bit map applications because most of the residuals will be quantized to zero in low bitrate applications by the encoder. The residue map 11 supplies prediction and dequantized errors as $DCT^{-1}$ and $Q^{-1}$. Discrete cosine transform (DCT) is a well-known tool for modeling information and applying compression principles. Transforms assist in analyzing the spatial frequency of a single picture and can be used at a predetermined number of cycles per height or width. DCT is a special type of Fourier transform which serves to deconstruct a periodic waveform into a series of harmonically related signals of varying phases and amplitudes. At the end of a standard decoder, the inverse DCT information is dequantized and inverse transformed into prediction errors which are supplied to the residue map 11 in the motion post processing unit 10 by block-based video decoder 40.

Segmentation unit 20 includes segmentation circuit 22, preceding frames storage unit 21, and current frame storage unit 23, and may optionally include morphological closure unit 60 and template matching unit 70 to refine the segmentation result. Segmentation circuit 22 identifies the moving object (MOt2) and the three categories of background information (stationary, covered and uncovered) as SBt2, UBt2, and CBt2 of frame ft2. These three background values are then output to the ffi classification unit 50. The moving object information (MOt2) is output from line 25 to morphological closure unit 60 as part of the process used to obtain a final segmented result. After performing morphological closure, unit 60 outputs the morphologically processed information to template matching unit 70 via line 61.

Motion post-processing unit 10 receives blockwise vectors and pixel values from decoder 40 at line 41, and the residue map 11 receives inverse discrete cosine transforms ($DCT^{-1}$) and dequantized prediction errors $Q^{-1}$ at line 43.

Motion vector mapping unit 15 receives refined pattern block information about the moving object block from template matching unit 70. Motion vector mapping unit 15 outputs motion vector information v1,2(p) and pixel intensities at line 151 to ffi classification unit 50.

The ffi classification unit 50 provides classification of MOti, SBti, UBti and CBti to MCI prediction unit 30 for standard MCI prediction. MCI prediction unit 30 performs gap closure on the moving object MOti prior to MCI prediction of the background information to prevent striped artifacts.

Motion post-processing of block-based motion field and pixel information by the motion vector replacement unit 13 is performed to determine whether a value of a motion vector V(B(p)) should be replaced, for example by a median value of eight nearest neighbor surrounding macroblock values. FIG. 2B shows this relationship between V(B(p)) and the eight nearest neighbors surrounding N(p) by a local temporal histogram. If V(B(p)) is not near the true value, it is replaced by taking the median value of $\{V(b(p))|b(p))\in N(p)\}$. This value is output to motion vector mapping unit 15. Motion vector V(B(p)) is determined to be unreliable based on, for example, (1) the motion vector B(p) supplied by the decoder 40 has a detected value that is not close to the true motion (for instance, a large magnitude shown in residue map 11), (2) a large motion vector is detected to have a different direction from the nearest neighbor macroblocks, (3) the coding of the motion vector V(B(p)) as received from decoder 40 is in INTRA mode, or (4) more than two neighboring macroblocks N(p) are coded in INTRA mode. The reason that more than two neighboring macroblocks coded in INTRA requires motion vector post-processing is that this is an indication that the motion vector either cannot be found or is unreliable. In these instances, there is replacement involving, for example, substituting a median value from the nearest neighbor macroblocks surrounding B(p) for the value of the motion vector B(p).

Figure 3:
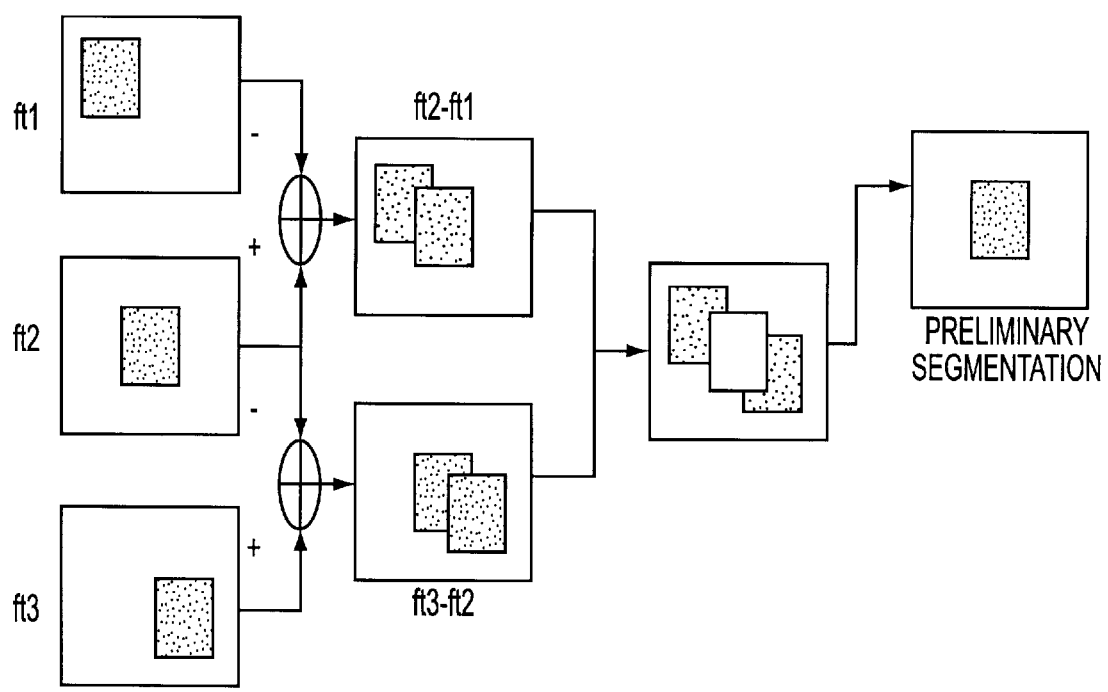
FIG. 3 shows features of the moving objects segmentation unit.

Segmentation circuit 22 provides preliminary segmentation on a moving object after receiving frame information about two previous frames from preceding frames storage 21 and the current frame from storage 23 according to a process shown in FIG. 3. The three successive frames are labeled ft1, ft2 and ft3. Similar to the process disclosed by Tubaro and Rocca in reference [6], a subtraction of ft1 from ft2, and ft2 from ft3 occurs in the segmentation circuit 22. Subsequently, the results of the two subtractions ($ft_{2-1}$ and $ft_{3-2}$) are compared to identify the overlap between the results. The overlap (shown in the white square number) in FIG. 3 is subsequently identified as the preliminary segmented object that is output to the morphological closure unit 60.

Figure 5A:
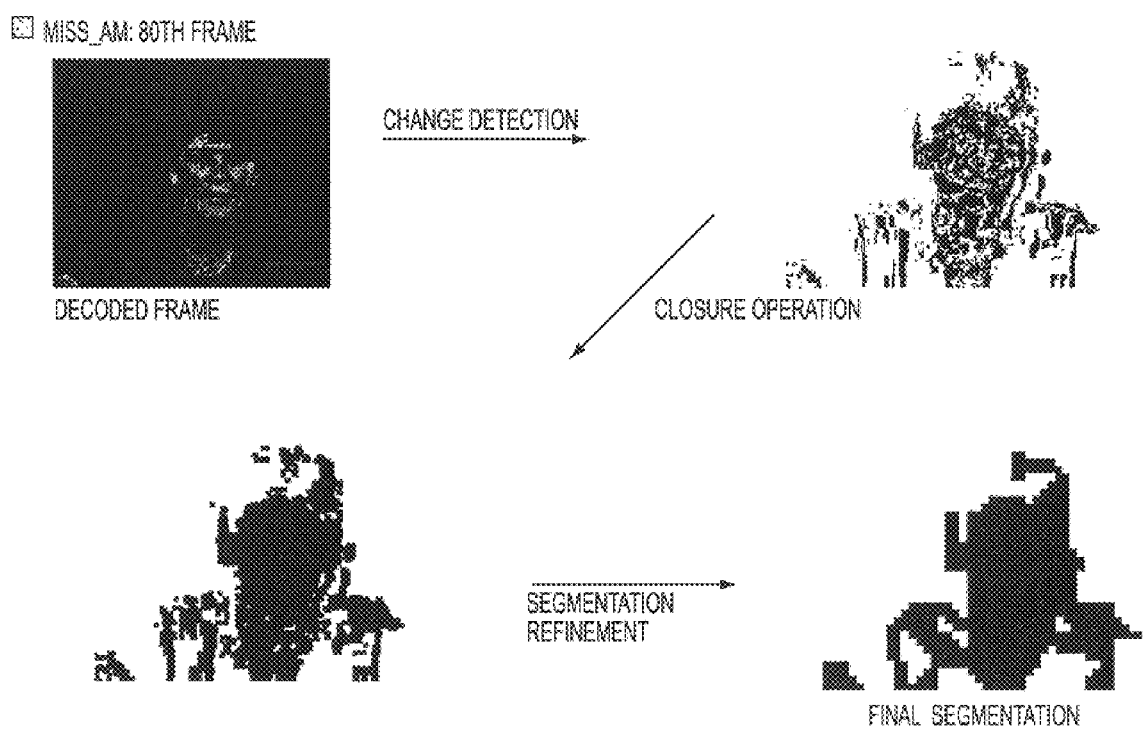
FIGS. 5A and 5B illustrate results of object segmentation.
Figure 5B:
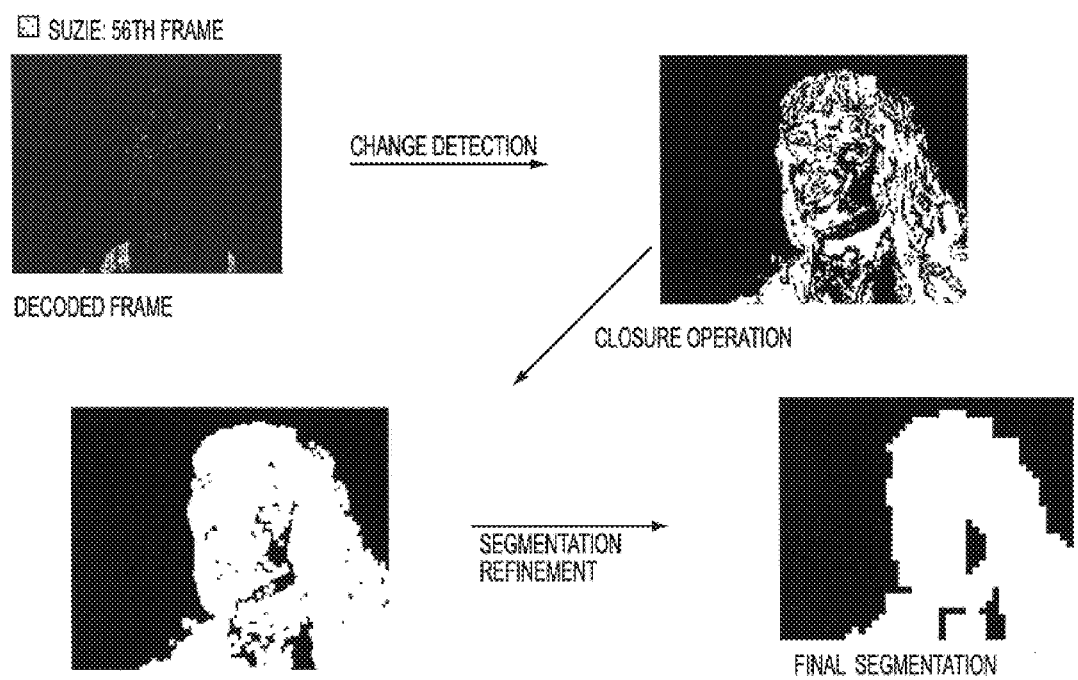

Morphological closure unit 60 performs, in accordance with a technique known in the art, a closure operation to remove small holes within the segmented object output from line 25 of segmentation circuit 22. FIGS. 5A and 5B each show how morphological closure removes most of the small holes in the moving object and provides an output which has primarily solid areas. This morphologically closed value is output to template matching unit 70 via line 61.

Template matching unit 70 replaces the morphologically closed result with a template (or pattern block) which is most closely matched from among the pattern blocks in storage. A total of 34 pattern blocks are used in this embodiment, and some of their patterns are shown in FIG. 4. Template matching unit 70 refines the MO segmentation result by replacing the pixel-wise MO shape with the sub-block wise (each sub-block has 4×4 pixels) shape as shown in the lower steps of FIGS. 5A and 5B. It should be noted that, in this context, shape replacement is to be distinguished from pixel intensity replacement. FIGS. 5A and 5B both depict a block labeled "final segmentation." The final segmentation result is the template block matched most closely to the morphologically closed block.

The final segmented object is provided to the notion vector mapping unit 15 via line 171 for mapping. It is in motion vector mapping unit 15 that blocked-base motion vector values are used to determine pixel values and intensities. The pixel values and intensities are grouped in sub-blocks of 4×4 pixels. The information v1,2(p) and pixel intensities are output at line 151 to the ffi classification unit 50.

Figure 6A:
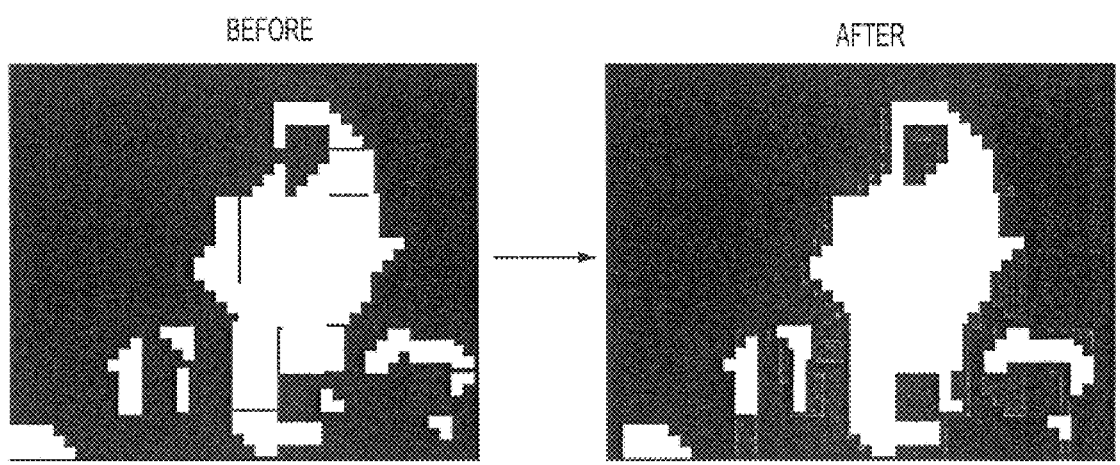
FIGS. 6A and 6B illustrate results of gap closure performed on the results of FIGS. 5A and 5B, respectively.
Figure 6B:
Figure 7A:
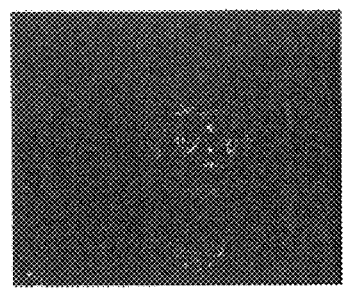
FIGS. 7A–7E show interpolated frames results derived from two decoded frames.
Figure 7B:
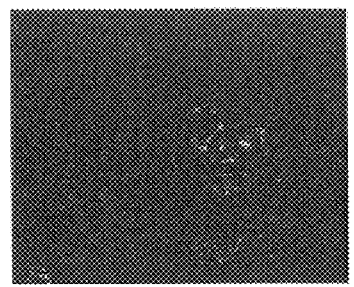
Figure 7C:
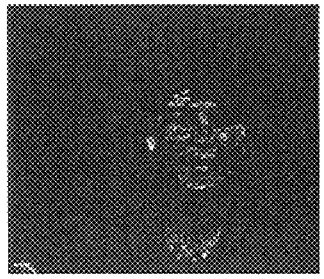
Figure 7D:
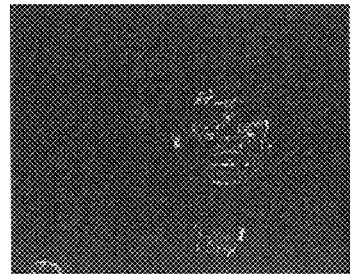
Figure 7E:
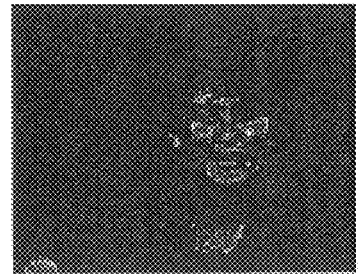

The ffi classification unit 50 receives information about SBt2, UBt2 and CBt2 (of frame ft2) from output line 121 of segmentation circuit 20. The ffi classification unit provides an output of MOti, SBti, UBti and CBti to the MCI prediction unit 30. As shown in FIG. 1, MCI prediction unit 30 comprises three units. Eqns. (1)–(3) module 301 performs at least one of Equations (1)–(3) on MOti. Gap closure unit 302 closes gaps so that striped artifacts are not produced when the background information is interpolated. FIGS. 6A and 6B show how the gap closure unit closes the block into primarily solid areas. Then Eqns. (4)–(6) module 303 performs Equations (4)–(6) on the blocks to interpolate the background information SBti, UBti and CBti. The MCI prediction unit 30 applies equations (4) to (6) to complete the generation of the interpolated frame. The four classes of FMCI are the same as in standard MCI.

Figure 2A:
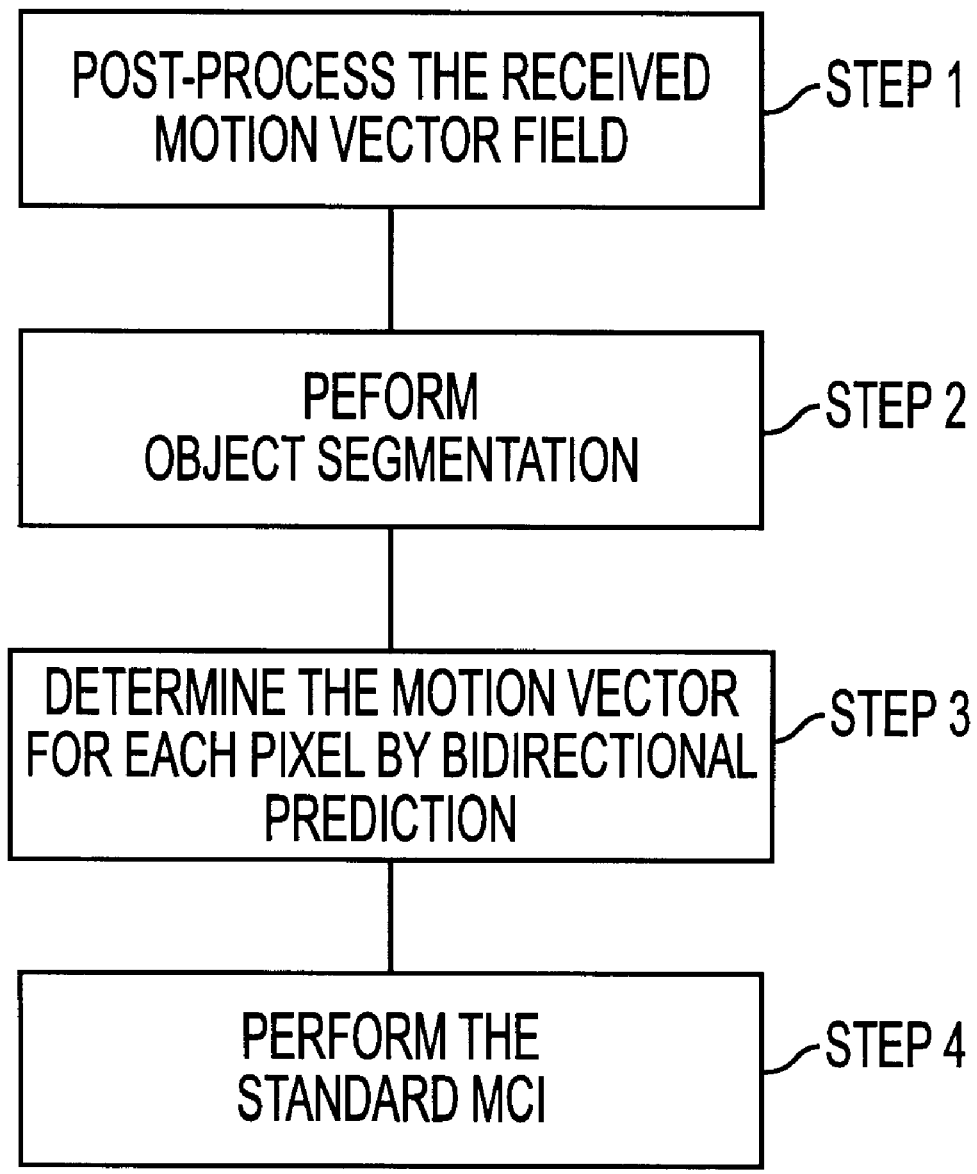
FIG. 2A shows the operational steps carried out by the FMCI device of the present invention.

The details of the operation of FMCI device 100 correspond to steps 1 to 4 shown in the flow diagram of FIG. 2A and will now be described in further detail.

Step 1: Perform post-processing on the received block-based motion vector field.

The performance of the MCI scheme depends on the accuracy of the displacement motion vector field, which is derived from the block-based motion vector field transmitted from the video encoder 40 on line 41. Decoder 40 makes no assumption about which motion estimation scheme is adopted by the encoder. For example, if an exhaustive motion search is used at the encoder, the block-based motion field may be far away from the true motion field since correlation among adjacent block-based motion vectors is not considered. Accordingly, the motion vector field must be processed to remove inaccurate motion vectors. In the H.263/H.263+ standard, macroblocks are allowed to be coded as INTRA blocks even though the frame is coded as an INTER-frame (i.e. P-frame). The INTRA block has no associated block-based motion vector. This is another reason why motion post-processing is important.

In accordance with the diagram shown in FIG. 2B, by assuming that the target block is B(p), the motion post-processing unit 10 uses a local temporal motion histogram of NB(p). If V(B(p)) is not near the true motion, it is replaced by taking the median value from the motion set {V(b(p))|b(p)∈N(p)}. It has been found experimentally that there are four cases where motion post-processing is required. The first case is where V(B(p)) is a large motion vector with a significantly different direction from those of its neighbors. The second case is where B(p) is coded in the INTRA mode. The third case is where more than two blocks among N(p) are coded in the INTRA mode. The third case requires motion post-processing because the INTRA mode usually implies that no good motion vector can be found from the encoder. If there are too many INTRA blocks in N(p), it is very likely that the target motion vector may be unreliable. The fourth case exploits the information in residue map 11 which is useful in higher bit rate applications. This involves detection of a large magnitude value in residue map 11 indicating that the received motion vector is not good enough for interpolation so that motion vector post-processing is required.

Step 2: Perform moving object segmentation.

Employing the basic framework of Tubaro et al. (reference [6]), three consecutive frames (i.e the current and the two immediately preceding frames) are used in the segmentation operation. The segmentation technique is illustrated in FIG. 3 and is discussed above. In FIG. 3, ft2 and ft3 denote the preceding frames and ft1 denotes the current frame. Two maps of change detection are obtained by subtracting ft1 from ft2, and ft2 from ft3. The two maps of change detection (ft2–1 and ft3–2) are processed in accordance with an algorithm such as disclosed by Tubaro, et al. (reference [6]) in order to obtain two-state segmentation among MO and SB/UB/CB. That is, segmentation circuit 20 merely distinguishes between MOt2 and SBt2/UBt2/CBt2. The ffi class identification unit 50 distinguishes among MOti SBti, UBti and CBti as discussed below. A small threshold is used in change detection to remove the background noise. The segmentation circuit 20 gives the preliminary moving object segmentation result which is output on line 25.

In this embodiment, the FMCI method utilizes a two-pronged approach to remove segmentation noises from the preliminary segmentation result stored in preliminary segmentation map 305 and thereby obtain a final (reliable) segmentation result.

First, morphological closure operation unit 60 performs a closure operation to remove small holes inside the segmented object. Second, template matching unit 70 performs an operation wherein the preliminary segmentation result is refined further by matching blocks with some pre-defined template blocks. These template blocks are illustrated in FIG. 4.

For simplicity, certain symmetric patterns (such as 90- 180- and 270-degree of rotations) are not shown in FIG. 4. In total, 34 pattern blocks are defined. Each pattern block has a macroblock size of 16×16 (256 pixels), which is the same size as a standard macroblock used for current video coding standards such as H.261, H.263, MPEG-1 and MPEG-2. There are 16 sub-blocks (i.e. squares) arranged as 4 sub-blocks by 4 sub-blocks for each pattern block in FIG. 4, and each sub-block or square represents 4 pixels by 4 pixels for a total of 16 pixels. The small squares with the cross-hatched squares and the white squares represent the moving object and the background respectively. In each pattern, the sub-blocks are assigned an intensity at one of two levels, white or black; all pixels within the subblock are thus assigned the same intensity. Template matching unit 70 refines the morphological closure result to achieve the final segmentation result which simply replaces each macroblock from the morphological segmentation result output by morphological closure unit 60 with that of the most similar pattern block. The intensities of the pixels within the pattern are substituted for the pixels intensities of MOt2. Then, the final segmentation result output on line 171 is used for standard MCI after motion vector mapping performed by mapping unit 15.

The rationale underlying adoption of the pattern block refined segmentation performed by template matching unit 70 is described below. Without performing a pixel motion search, the pixel motion of an object is assigned directly from the block motion vector. If the segmented object cannot be represented in a concrete form but rather only with many isolated pixels, the assignment from the block motion to the pixel motion becomes meaningless since the granularity of the block motion vectors is too coarse to represent such detailed information. As shown in FIG. 4, each pattern block (except the last two blocks) allows at most two continuous regions after segmentation. One region (the cross-hatched one) represents the object and the other region (the white one) represents the background. The refined segmentation process makes the assignment of the pixel motion field from the block motion vector field more meaningful. The reason for choosing the 16 pixels (4×4), as one sub-block unit of a pattern block is to avoid detailed pixel-level segmentation.

Step 3: Determine the displacement motion vector for each pixel in the segmented object region and interpolate the moving object.

Step 3 is performed in part in motion vector mapping unit 15, ffi classification unit 50 and Equations (1)–(3) module 301. Steps 1 and 2 yield respectively the post-processed block-based motion vector V on line 131 and the segmented moving object MOt2 on line 171. MOt1 was obtained beforehand. By using these three pieces of information, the moving object MOti can be interpolated with MCI prediction as follows. First, the pixel motion inside the segmented moving object is assigned from the corresponding block motion vector with the assumption that the moving objects are rigid bodies with translation motion only. That is, let v1,2(p) have the value of V(B(p)). If p∈MOt2, we can traverse the motion trajectory of Rb(v1,2(p)) from MOt2. The location and the intensity of MOti can be determined by using MCI prediction for the MO class as given by Equations (1) to (3) and performed in Equations (1)–(3) module 301. The bi-directional prediction (Eqn. 3) of the moving object is used in the FMCI of the present invention. It efficiently eliminates the effects of inaccurate displacement motion vector assignment and reduces artifacts.

After applying the MCI bi-directional prediction (Eqn. 3) for MOti, gap closure unit 302 within MCI unit 30 performs a gap closure operation to reduce striped artifacts. Striped artifacts result from the previously discussed problem with holes. After performing pattern block refined segmentation in template matching unit 70 and motion vector mapping in unit 15, the holes within MOti are in the form of horizontal or vertical gaps located in the moving block boundary or the object boundary. If those gaps are not filled prior to advancing to the next step, the gaps will be classified as the background, and this will produce striped artifacts. Gap closure unit 302 performs a gap closure operation on the output of Equations (1)–(3) module 301. In the operation, a gap threshold is set and the image frame is scanned along the horizontal direction row-by-row (in terms of pixel size) to fill the vertical gaps. After the row scanning, the image frame is scanned along the vertical direction column-by-column (in terms of pixel size) to fill the horizontal gaps. Two iterations of gap closure operations over the entire image are used to fill all possible gaps. During the process of scanning vertical or horizontal lines, if a gap is found, it is filled using a linear interpolation of the intensities of two end pixels of the gap edge. The gap closure operation is performed on MOti and successfully removes the gaps (and striped artifacts) in the MCI frame.

Step 4: Determine the remaining three classified regions UBti, CBti and SBti for the interpolated frame, and then perform standard MCI accordingly.

After completing steps 1 to 3, the object location MOti is known. According to the procedure discussed above regarding the classified regions of MCI, ffi class identification unit 50 divides the background region into three classes, i.e. UBti, CBti and SBti. Equation (4)–(6) module 303 within MCI prediction unit 30 applies Equations (4)–(6) to these background classes for interpolation after performing gap closure. When this step is completed, MCI prediction unit 30 outputs the successfully interpolated whole frame (fti) on line 31.

Performance of FMCI

The experiments are performed based on the "Test Model Near-Term version 8.0: (aka TMN8) H.263+(from the University of British Columbia) video codec software, by replacing frame repetition with the FMCI method. Two quarter common intermediate format (QCIF) sequences, "Miss America" and "Suzie," were used as the test videos to demonstrate the visual performance of FMCI. In the encoder end, the original frame rate input sequence is 30 frames per second (fps), the basic mode (i.e. no optional mode is activated) is chosen, and a quantization step size of 20 is used. A frame skip of 10 is used for the "Miss America" sequence, and a frame skip of 3 is used for "Suzie." The required bandwidth for these encoded bitstreams is only 8K bps due to the adoption of the large frame skip. This bitstream will generate decoded video with 3 fps in the decoder. However, after inserting nine interpolated FMCI frames, the frame rate can be restored to 30 fps, which is the same as the original video sequence.

The segmentation results of the proposed FMCI are shown in FIGS. 5A and 5B. FIG. 5A depicts both the decoded 80th frame and the final refined segmentation using pattern blocks, and FIG. 5B shows the 56th frame of another image and its final segmentation. FIG. 5A also illustrates the intermediate results of the preliminary and morphological segmentation stages, respectively. It is clear that the shape of the final segmentation is more suitable for the block-based FMCI interpolation.

FIGS. 6A and 6B show the functionality of the gap closure designed for the FMCI of the present invention for the images in FIGS. 5A and 5B, respectively. As mentioned above, the moving object in the interpolated frame will have some holes appearing in the shape of vertical or horizontal gaps. The white areas in FIGS. 6A and 6B indicate the interpolated moving object after two iterations of gap closure, which successfully remove the gap and avoid the striped artifacts.

The visual performance of the FMCI of the present invention can be observed from FIG. 7. The decoded 80th and 90th frames of Miss America are shown in FIGS. 7A and 7B, respectively. These two frames are continuously decoded frames because the adopted frame skip is 10. The FMCI of the present invention is applied to these two decoded frames to increase the frame rate to 30 fps. The interpolated 82nd, 85th and 88th frames using FMCI are shown in FIGS. 7C, 7D and 7E. It is shown in these Figures that FMCI can successfully predict the intermediate frames between the two decoded frames.

The Peak Signal-to-Noise Ratio (PSNR) is the most widely-accepted measure of performance in the video communication field. The mathematical definition of PSNR is $$PSNR = 10\log_{10}((255^2)/(MSE)); \text{ and}$$

$$MSE = \frac{1}{M \times N} \sum_{m=1}^{M} \sum_{n=1}^{N} (f_{ori}(m,n) - f_{int}(m,n))^2$$

where MSE denotes "mean squared error," $f_{ori}(m,n)$ is the original M×N picture to be dropped in transmitting and $f_{int}(m,n)$ is its interpolated counterpart.

Figure 8:
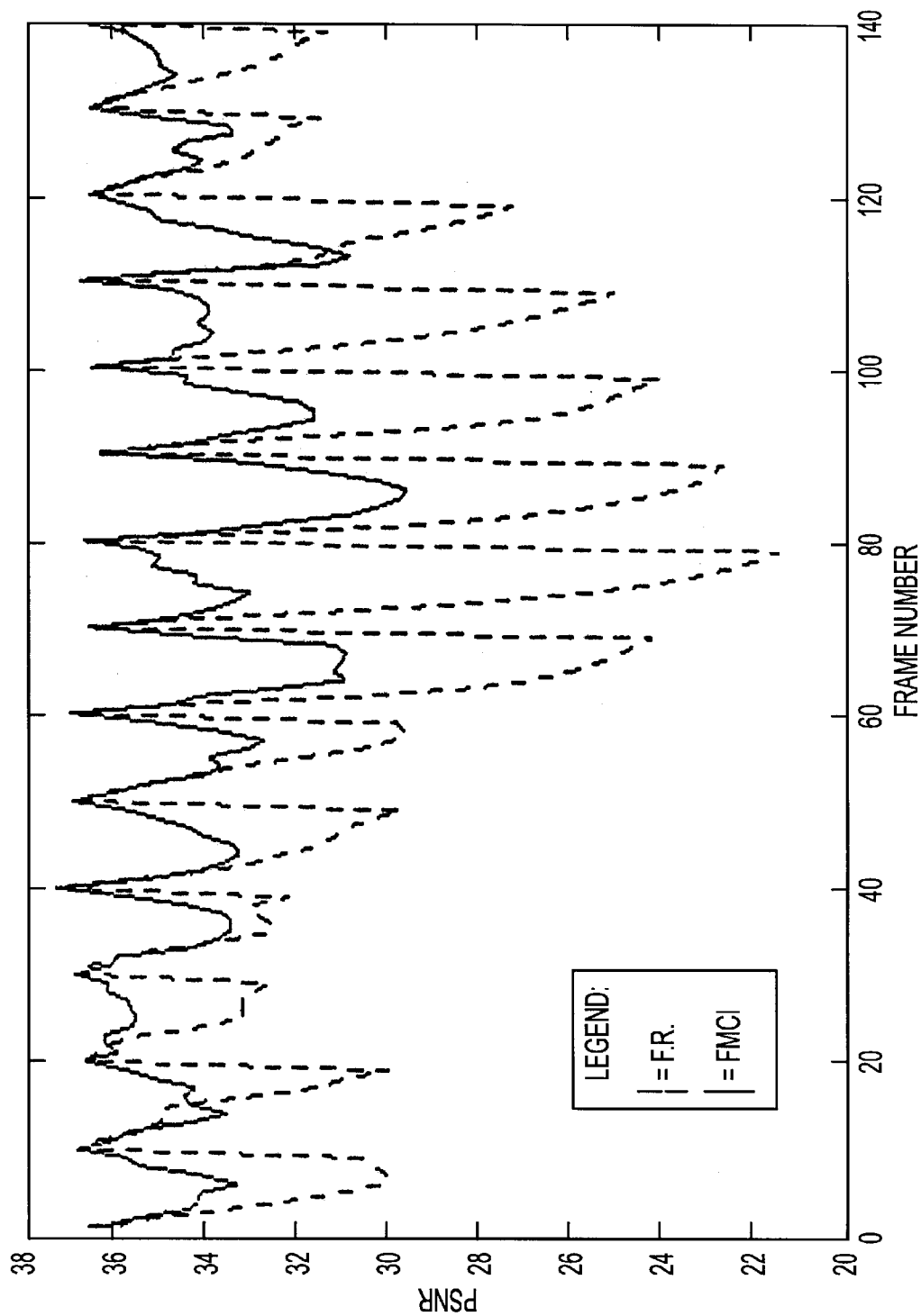
FIG. 8 is a graph of the PSNR quality of the FMCI results of FIG. 5A.
Figure 9:
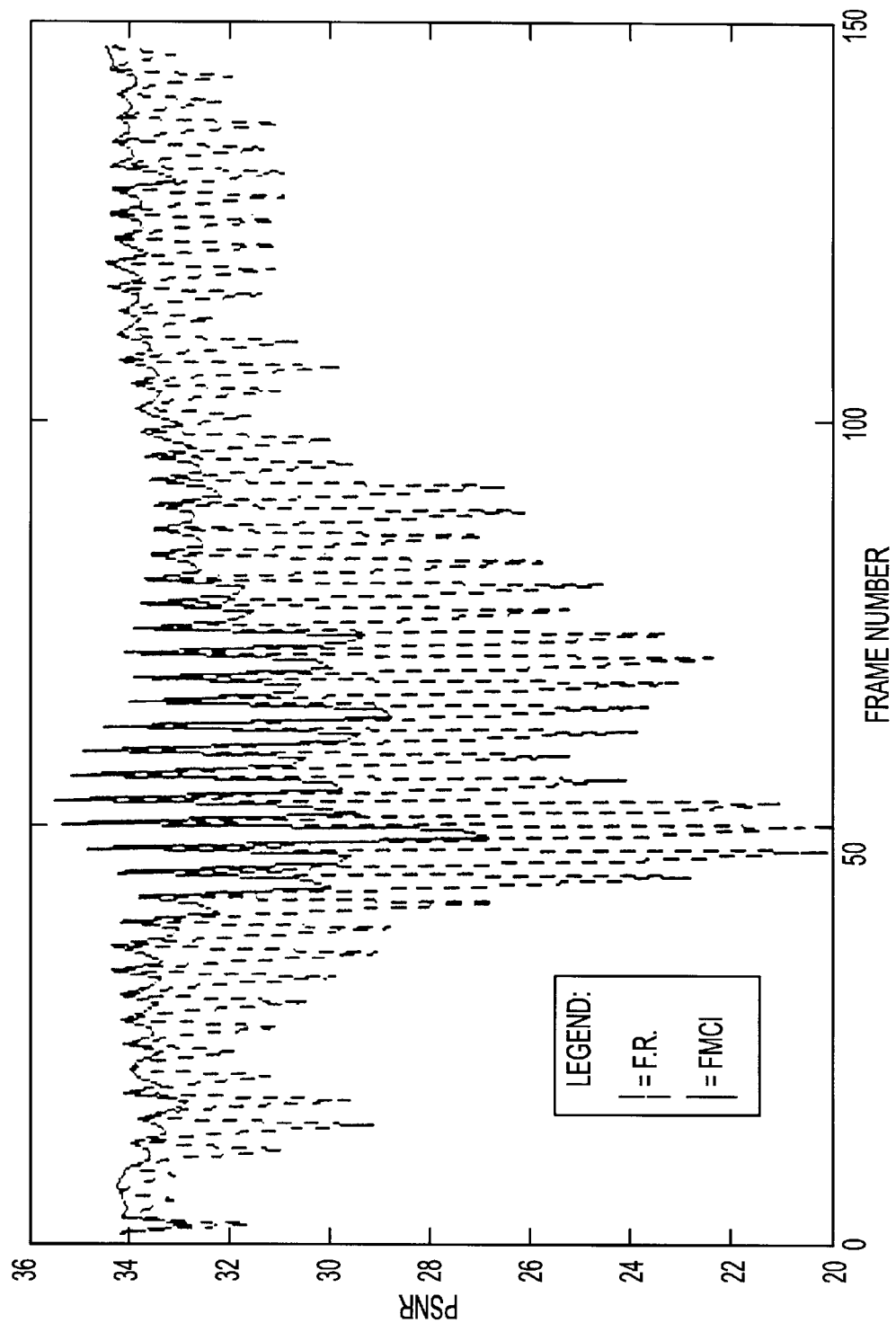
FIG. 9 is a graph of the PSNR quality of the FMCI results of FIG. 5B.
Figure 10:
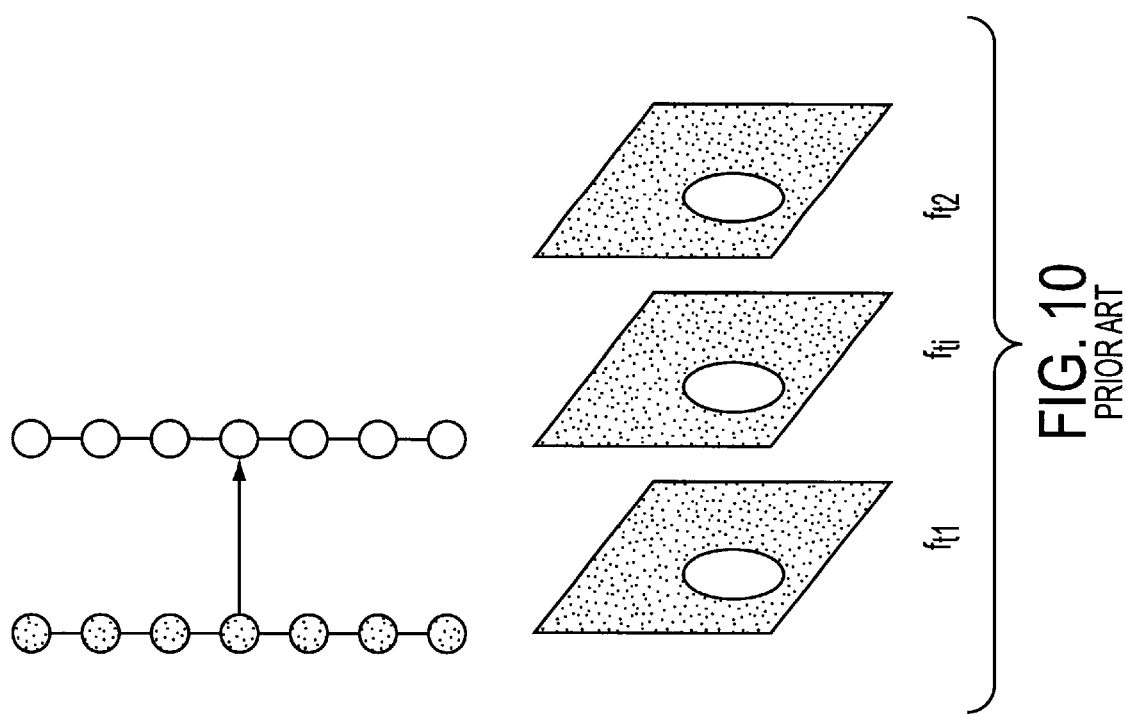
FIG. 10 shows the prior art interpolation method of frame repetition.
Figure 11:
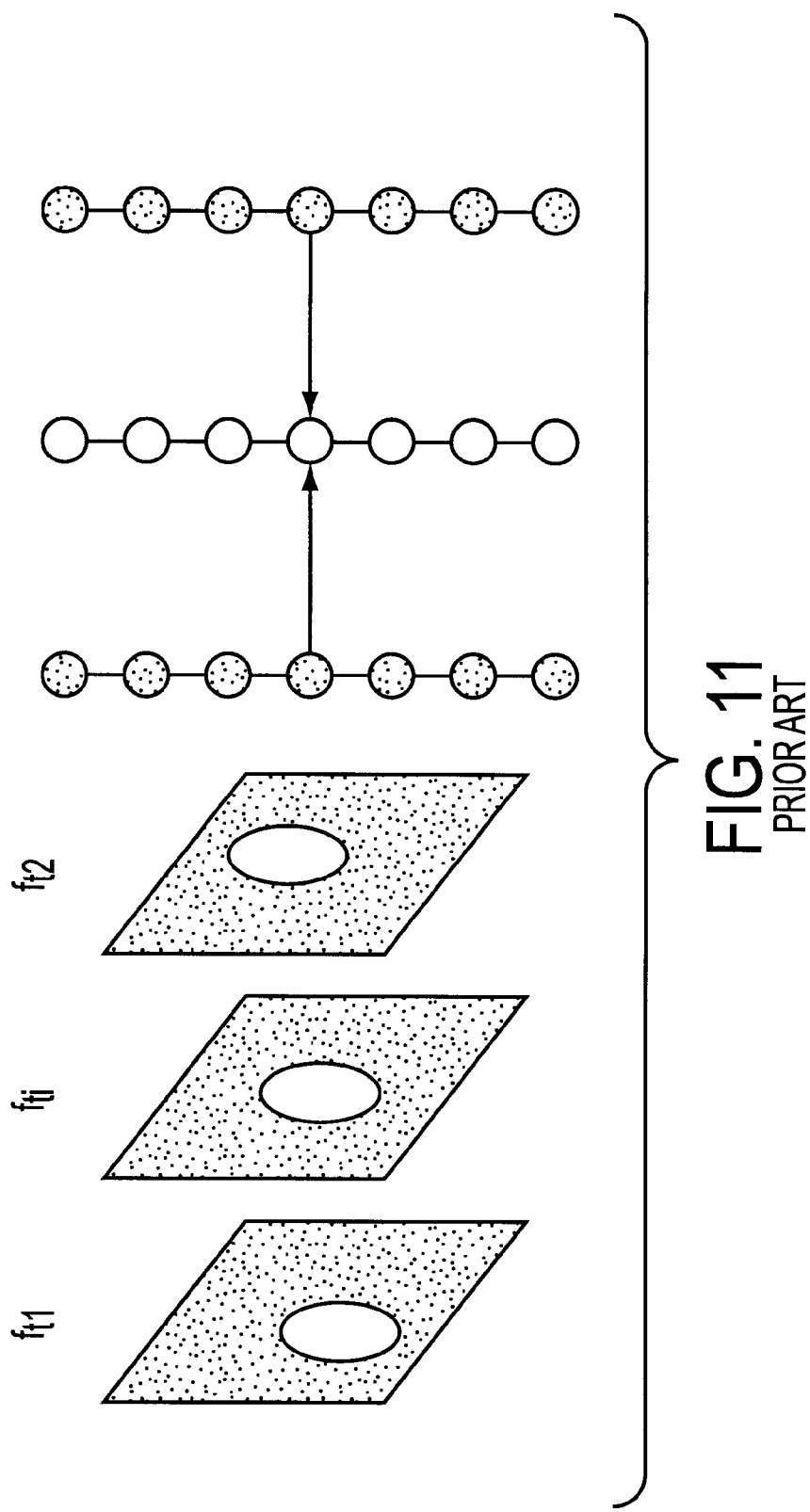
FIG. 11 shows the prior art interpolation method of frame averaging.
Figure 12:
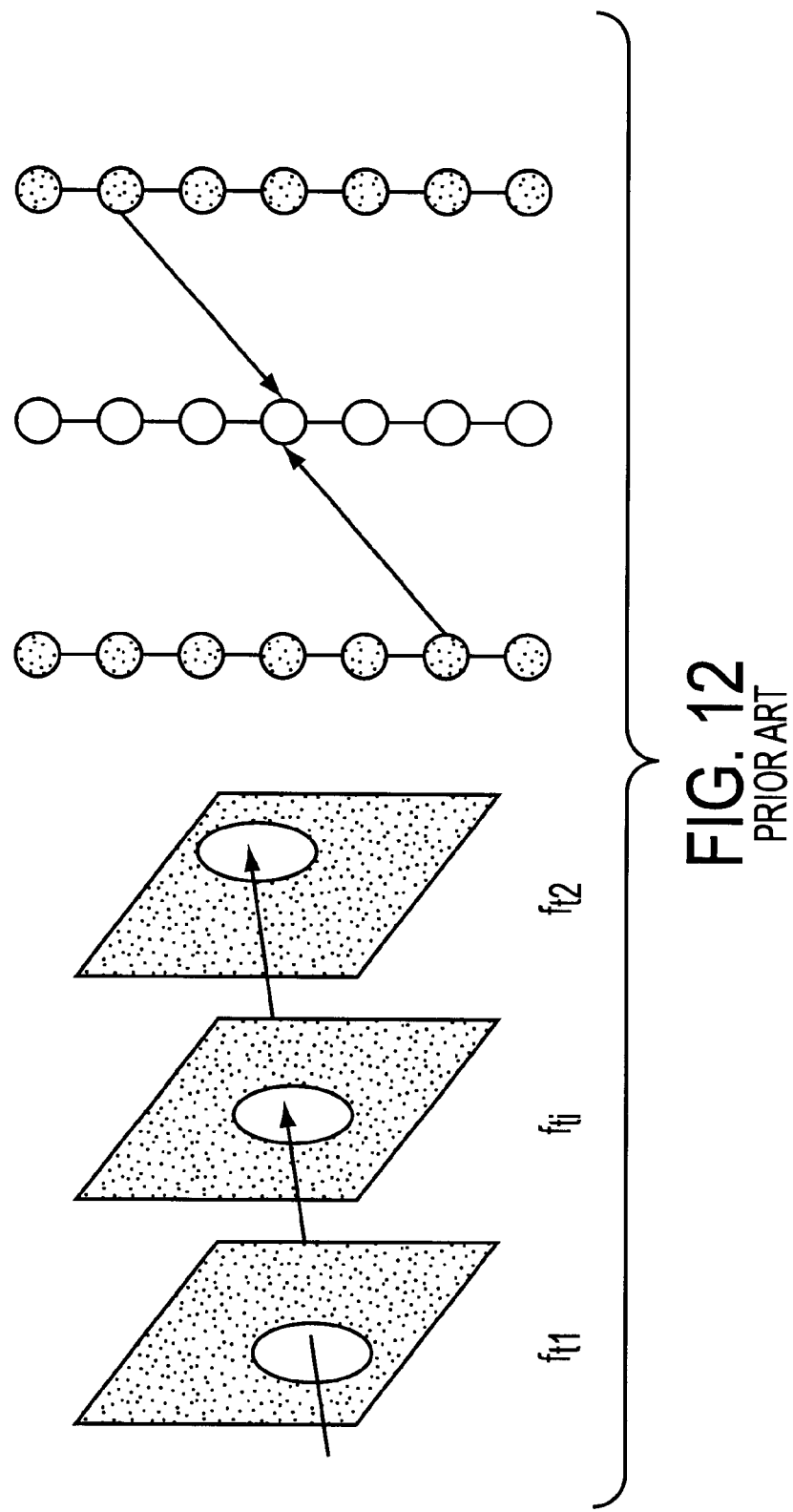
FIG. 12 shows the prior art interpolation method of MCI for each pixel.
Figure 13:
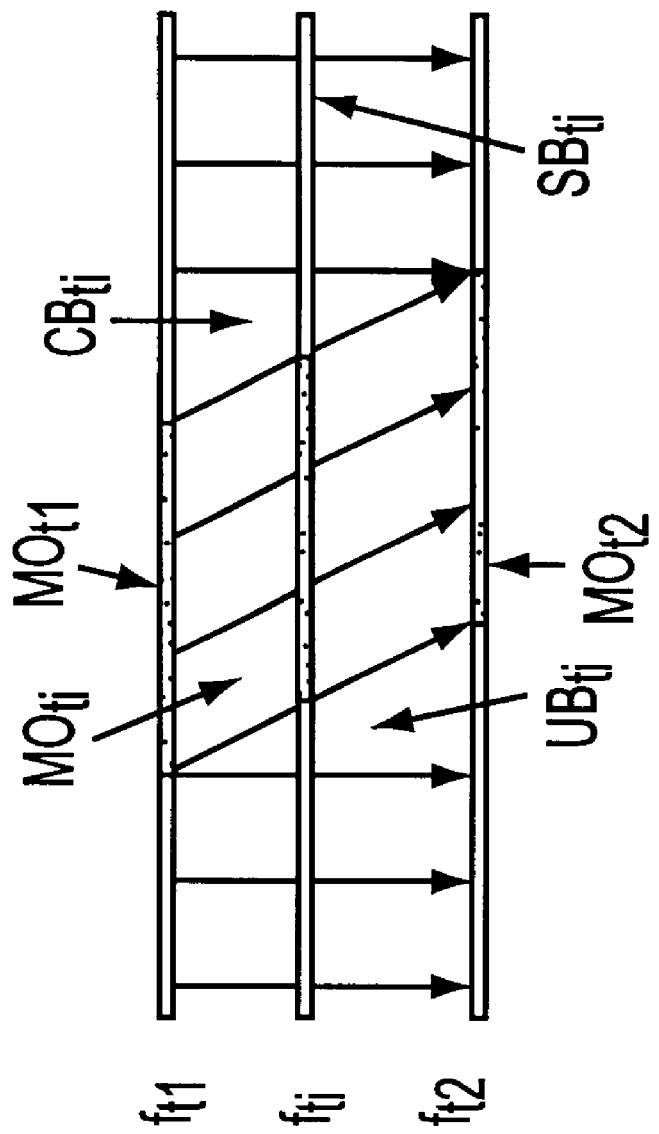
FIG. 13 illustrates the four classes identified by standard MCI.

The PSNR quality of the FMCI method of the present invention is illustrated in FIGS. 8 and 9. As shown in FIGS. 8 and 9, the PSNR performance of the, quantized common intermediate format (QCIF) test image sequence "Miss America" with 10-frame skipping and "Suzie" with 3-frame skipping are compared for the FMCI of the present invention versus the frame repetition method. It is evident that the FMCI method of the present invention can achieve significant PSNR improvement over the frame repetition method.

Additionally, it should be noted that it is not appropriate to evaluate the performance of frame interpolation only by using a PSNR metric. The reason is because the goal of FMCI frame interpolation is to make the video object move smoothly, rather than precisely predicting the object location in the uncoded frame of the original sequence. Although the PSNR comparison provides a useful numerical gauge, the viewer will perceive enhanced quality from the increased smoothness of motion that cannot be detected by the PSNR comparison.

Various modifications and adaptations may be made to the present invention by those skilled in the art that fall within the scope and the spirit of the appended claims. For example, it should be clearly understood that a standard video decoder that provides block-based motion vectors does not have to be in an H.26x or MPEG compression format. In addition, it is possible that the cascading of the codec to the post processing unit could be via a wireless or fiber optic transmission, or via the Internet. The number of pattern blocks may well exceed 34 patterns, and the size of the pattern block may change size, especially should the size of the now-standard macroblock (256 pixels) become a different value.

We claim:

1. A method of block-based motion-compensated interpolation of a video signal based on blockwise motion vectors and frame information of a plurality of frames being provided by a block-based video decoder, said method comprising:

(a) performing a segmentation operation on said plurality of frames of said video signal to identify an initial moving object block and background information blocks, wherein said background information blocks are identified as a stationary block (SB), an uncovered block (UB), and a covered block (CB), (b) mapping a motion vector of one of said blockwise motion vectors to provide an output of a mapped moving object block (MO) whose pixels each have said motion vector mapped thereto, (c) classifying said mapped moving object block (MO) obtained in step (b) and said background information blocks obtained in step (a) to identify an interpolated mapped moving object block (Moti) and interpolated background information blocks including an interpolated stationary block (SBti), an interpolated uncovered block (UBti), and an interpolated covered block (CBti), and (d) processing Moti, SBti, UBti, CBti and said frame information from said plurality of frames to generate an interpolated frame relative to said one of said frames, wherein the segmentation operation further comprises:

(i) performing a morphological closure operation by removing holes in said initial moving object block to obtain a morphologically closed segmented moving object block, (ii) performing pattern block refinement by comparing said morphologically closed segmented moving object block obtained in step (i) with a plurality of pattern blocks, and obtaining a pattern block having a closest matching pattern to said morphologically closed segmented moving object block, and (iii) replacing said morphologically closed segmented moving object with said pattern block selected in step (ii).

2. A method according to claim 1, wherein said blockwise motion vectors and said frame information received in step (a) are provided by one of an MPEG and a H.26x video decoder.

3. A method according to claim 1 further comprising providing said mapped moving object block (MO) produced by step (b) with a shape corresponding to a shape of said closest matching pattern block.

4. A method according to claim 1 wherein said plurality of pattern blocks comprises 34 patterns.

5. A method according to claim 1 wherein each pattern block of said plurality of pattern blocks is a macroblock comprising 16×16 pixels provided in 16 sub-blocks arranged in a 4×4 matrix, and each one of the sub-blocks comprises 16 pixels arranged in a 4×4 matrix.

6. A method according to claim 1 wherein step (d) includes:

performing gap closure of said interpolated moving object block (MOti) to obtain increased solid areas to improve a quality of said interpolated frame.

7. An apparatus for performing block-based motion-compensated frame interpolation of a video signal based on blockwise motion vectors and frame information of a plurality of frames of said video signal, said apparatus comprising:

(a) segmentation means for performing a segmentation operation on said plurality of frames of said video signal to identify an initial moving object block and background information blocks for one of said frames, said background information blocks comprising a stationary block (SB), an uncovered block (UB) and a covered block (CB);

(b) mapping means for mapping a motion vector of one of said blockwise motion vectors to each pixel of said initial moving object block to provide a mapped moving object block whose pixels each have said motion vector mapped thereto;

(c) classification means for processing said mapped moving object block (MO) output from said mapping means and said background information blocks obtained from said segmentation means to identify an interpolated mapped moving object block (MOti) and interpolated background information blocks including an interpolated stationary block (SBti), an interpolated uncovered block (UBti), and an interpolated covered block (CBti);

(d) motion compensated interpolation means for processing MOti, SBti, UBti, CBti and said frame information relating to said plurality of frames to generate an interpolated frame relative to said one of said frames;

(e) a motion vector replacement unit for comparing said one of said blockwise motion vectors with a set of predetermined criteria to determine whether a value of said one of said blockwise motion vectors requires replacement with a corrected value; and (f) a residue map which maps prediction errors obtained from a block-based video decoder and outputs said mapped prediction errors to said motion vector replacement unit.

8. An apparatus according to claim 7, further comprising:

a morphological closure unit for processing said initial motion moving object block output by said segmentation means to obtain a morphologically closed segmented moving object block.

9. An apparatus for performing block-based motion-compensated frame interpolation of a video signal based on blockwise motion vectors and frame information of a plurality of frames of said video signal, said apparatus comprising:

(a) segmentation means for performing a segmentation operation on said plurality of frames of said video signal to identify an initial moving object block and background information blocks for one of said frames, said background information blocks comprising a stationary block (SB), an uncovered block (UB) and a covered block (CB), (b) mapping means for mapping a motion vector of one of said blockwise motion vectors to each pixel of said initial moving object block to provide a mapped moving object block whose pixels each have said motion vector mapped thereto, (c) classification means for processing said mapped moving object block (MO) output from said mapping means and said background information blocks obtained from said segmentation means to identify an interpolated mapped moving.object block (MOti) and interpolated background information blocks including an interpolated stationary block (SBti), an interpolated uncovered block (UBti), and an interpolated covered block (CBti), (d) motion compensated interpolation means for processing MOti, SBti, UBti, CBti and said frame information relating to said plurality of frames to generate an interpolated frame relative to said one of said frames;

(e) a morphological closure unit for processing said initial motion moving object.block output by said segmentation means to obtain a morphologically closed segmented moving object block; and (f) a template matching unit for processing said morphologically closed segmented moving object block output by said morphological closure unit, wherein said template matching unit compares the morphologically closed segmented moving object block with a plurality of pattern blocks to obtain a most similar pattern block of said plurality of pattern blocks; and said template matching unit outputs said most similar pattern block of said plurality of pattern blocks to said motion vector mapping unit in place of said morphologically closed segmented moving object block.

10. An apparatus according to claim 7, wherein said motion compensated interpolation means includes:

a gap closure unit for processing gaps in said interpolated moving object block (MOti) to obtain increased solid areas in said interpolated moving object block (MOti) to improve a quality of said interpolated frame.

11. An apparatus according to claim 9, wherein said template matching unit comprises 34 pattern blocks in storage.

12. An apparatus according to claim 9 wherein each pattern block of said plurality of pattern blocks comprises a macroblock of 16×16 pixels provided in 16 sub-blocks arranged in a 4×4 matrix; and each sub-block comprises 16 pixels arranged in a 4×4 matrix.

13. An apparatus according to claim 9 wherein said mapped moving object block (MO) output by said mapping means has a shape corresponding to a shape of said most similar pattern block output by said segmentation means.

14. An apparatus according to claim 7, wherein said blockwise motion vectors and said frame information are provided by a block-based video decoder comprising one of an MPEG video decoder and a H.26x video decoder.

15. A method according to claim 1, wherein said blockwise motion vectors and said frame information received in step (a) are provided by one of MPEG-1, MPEG-2, H.261 and H.263 video decoder.

16. An apparatus according to claim 7, wherein said blockwise motion vectors and said frame information are provided by a block-based video decoder comprising one of MPEG-1, MPEG-2, H.261 and H.263 video decoder.

\* \* \* \* \*